(12) United States Patent
Menken et al.

(10) Patent No.: US 11,376,537 B2
(45) Date of Patent: Jul. 5, 2022

(54) FRAMED AIR FILTER WITH SKIP-SCORED SIDEWALL JUNCTION

(71) Applicant: 3M INNOVATIVE PROPERTIES COMPANY, St. Paul, MN (US)

(72) Inventors: Fiona E. Menken, Woodbury, MN (US); Brenda K. Balderas, Woodbury, MN (US); Dennis M. Glass, Cottage Grove, MN (US); Michael L. Munson, Maple Grove, MN (US); Mark A. Sanocki, Vadnais Heights, MN (US)

(73) Assignee: 3M Innovation Properties Company, St. Paul, MN (US)

( * ) Notice: Subject to any disclaimer, the term of this patent is extended or adjusted under 35 U.S.C. 154(b) by 347 days.

(21) Appl. No.: 16/671,585

(22) Filed: Nov. 1, 2019

(65) Prior Publication Data
US 2020/0139285 A1    May 7, 2020

Related U.S. Application Data

(60) Provisional application No. 62/755,082, filed on Nov. 2, 2018.

(51) Int. Cl.
*B01D 46/00* (2022.01)
*B01D 46/10* (2006.01)

(52) U.S. Cl.
CPC ......... *B01D 46/0005* (2013.01); *B01D 46/10* (2013.01); *B01D 2265/06* (2013.01); *B01D 2279/50* (2013.01)

(58) Field of Classification Search
CPC  B01D 46/10; B01D 46/0005; B01D 46/0002; B01D 46/0016; B01D 2265/06; B65D 25/04

USPC .............. 55/493, 495, 501, 503; 219/122.24, 219/120.03, 120.24, 120.38, 164, 199, 219/919, 918, 939; 493/92, 912

See application file for complete search history.

(56) References Cited

U.S. PATENT DOCUMENTS

| | | | |
|---|---|---|---|
| 3,830,045 A | | 8/1974 | Copenhefer |
| 3,938,973 A | * | 2/1976 | Kershaw ............ B01D 46/0002 55/501 |
| 3,970,440 A | * | 7/1976 | Copenhefer ........... B01D 46/10 55/501 |
| 3,992,173 A | * | 11/1976 | Wharton ............ B01D 46/0002 55/501 |
| 4,105,423 A | * | 8/1978 | Latakas .............. B01D 46/0002 55/501 |
| 4,594,492 A | * | 6/1986 | Maroszek .......... B65D 81/3453 426/243 |
| 5,950,915 A | * | 9/1999 | Moen .................. B65D 5/48048 229/199 |
| 8,241,381 B2 | | 8/2012 | Braunecker |
| 8,702,829 B2 | | 4/2014 | Lise |

(Continued)

FOREIGN PATENT DOCUMENTS

| | | |
|---|---|---|
| WO | WO 2017-176480 | 10/2017 |
| WO | WO 2018-029576 | 2/2018 |

*Primary Examiner* — Minh Chau T Pham
(74) *Attorney, Agent, or Firm* — Kenneth B. Wood

(57) ABSTRACT

A framed air filter that includes air filter media and a frame with four frame portions. At least one frame portion includes an inner sidewall and an outer sidewall that meet at a sidewall junction. The sidewall junction extends along a score line that includes at least one cut-scored segment and one crush-scored segment.

20 Claims, 4 Drawing Sheets

(56) References Cited

U.S. PATENT DOCUMENTS

| | | |
|---|---|---|
| 9,278,301 B2 | 3/2016 | Fox |
| 9,320,998 B2 | 4/2016 | Gillilan |
| 9,962,640 B2 | 5/2018 | Fox |
| 2004/0182055 A1 | 9/2004 | Wynn |
| 2007/0204574 A1* | 9/2007 | Workman .............. B01D 46/10 55/495 |
| 2007/0289272 A1* | 12/2007 | Justice .............. B01D 46/0005 55/495 |
| 2007/0294988 A1* | 12/2007 | Miller ................ B01D 46/0016 55/495 |
| 2009/0183477 A1* | 7/2009 | Workman .............. B01D 46/10 55/495 |
| 2010/0050581 A1* | 3/2010 | Schuld .............. B01D 46/0005 55/503 |
| 2013/0327004 A1* | 12/2013 | Lise .................. B01D 46/0002 55/501 |

* cited by examiner

FRAMED AIR FILTER WITH SKIP-SCORED SIDEWALL JUNCTION

BACKGROUND

Air filters are commonly used in forced air systems, e.g. residential heating and air-conditioning systems, in order to remove dust and dirt particles and the like.

SUMMARY

Herein is disclosed a framed air filter and method of making. The framed air filter includes air filter media and a frame with four frame portions. At least one frame portion comprises an inner sidewall and an outer sidewall that meet at a sidewall junction. The sidewall junction extends along a fold line that follows a score line that includes at least one cut-scored segment and one crush-scored segment. These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Definitions

Although terms such as "top", bottom", "upper", "lower", "under", "over", "front", "back", "up" and "down", and "first" and "second" may be used in this disclosure, it should be understood that those terms are used in their relative sense only unless otherwise noted. Terms such as "outer", "outward", "outwardmost", "outwardly", and the like, refer to a direction generally away from the geometric center of the air filter media. Terms such as "inner", "inward", "inwardmost", "inwardly", and the like, refer to a direction generally toward the geometric center of the air filter media. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties). The term "substantially" means to a high degree of approximation (e.g., within +/−10% for quantifiable properties) but again without requiring absolute precision or a perfect match. The term "essentially" means to a very high degree of approximation (e.g. within +/−4% for quantifiable properties) but again without requiring absolute precision or a perfect match.

Figure 1:
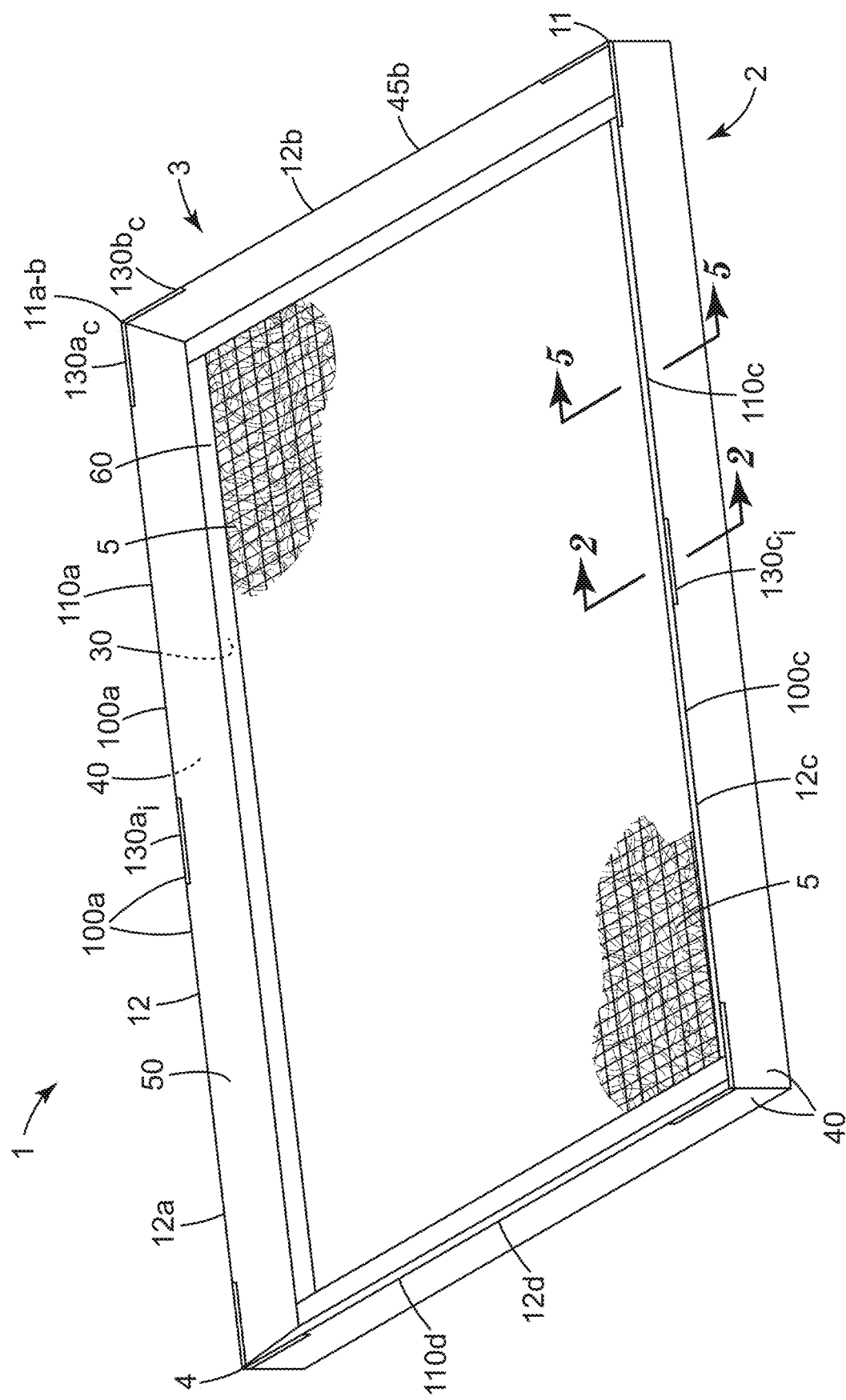
FIG. 1 is a perspective view of an exemplary framed air filter as disclosed herein, viewed from the downstream side of the framed air filter.
Figure 2:
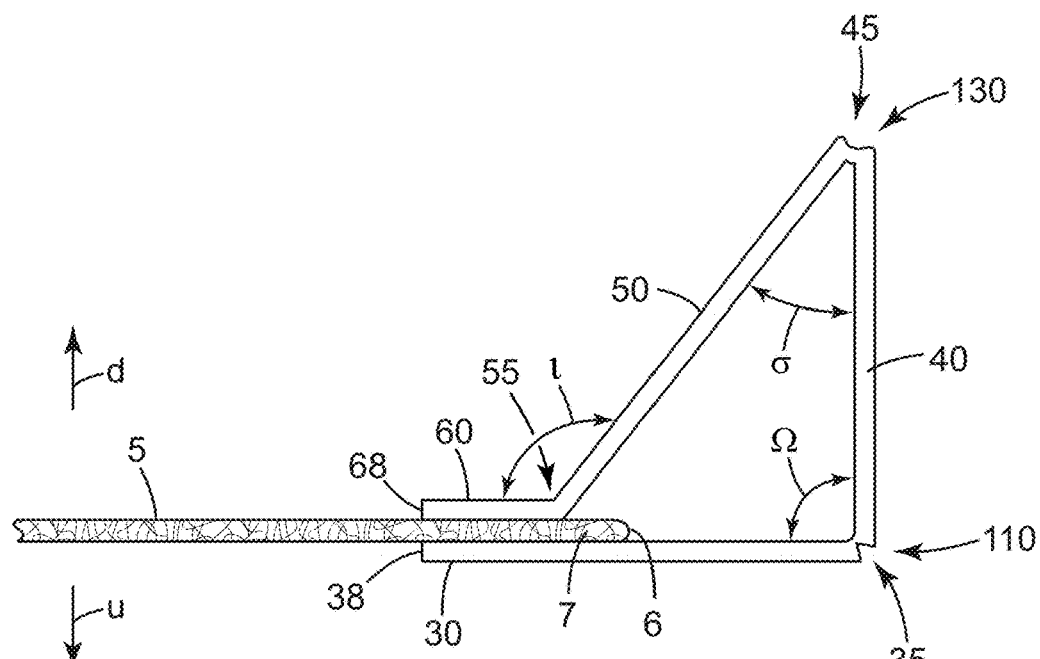
FIG. 2 is a cross-sectional slice view of a portion of the exemplary framed air filter of FIG. 1, taken along line 2-2.

The term "upstream" is used to denote the closed-end side of a framed air filter, corresponding to the far side of filter 1 as shown in FIG. 1 and to the lower side of filter 1 as shown in FIG. 2. The term "downstream" is used to denote the open-ended side of such an air filter (the side to which the filter frame sidewalls protrude), corresponding to the near side (the viewed side) of filter 1 as shown in FIG. 1 and to the upper side of filter 1 as shown in FIG. 2. (Certain figures are marked with "u" and "d" to aid in recognition of upstream and downstream sides of the filter and components.) These terms are used purely for convenience of description herein, in recognition of the observation that such filters are often placed into forced air ventilation systems with the closed-end side of the filter facing the stream of incoming air (i.e., facing upstream) and with the open-ended side of the filter facing downstream (e.g. with the terminal ends of the sidewalls resting against support flanges of the forced air ventilation system). However, it will be appreciated that in some cases such filters might be placed in an airstream in the reverse orientation; thus, it is emphasized that the terms upstream and downstream are used herein merely for convenience of description of various components of the filter and their geometric relationship, irrespective of how such a filter might be eventually installed into a forced air ventilation system.

DETAILED DESCRIPTION

Shown in FIG. 1 in perspective view from the downstream side is an exemplary framed air filter 1 as disclosed herein. Shown in FIG. 2 is a cross-sectional slice view of a portion of the exemplary air filter of FIG. 1, taken along line 2-2 of FIG. 1. Air filter 1 comprises an upstream side 2 and a downstream side 3, as depicted in FIGS. 1 and 2 and as defined and described above. Air filter 1 comprises air filter media 5 and frame 12 mounted generally on, and surrounding, perimeter 6 of filter media 5. Air filter 1 is at least generally rectangular in shape (which specifically includes square shapes) with four corners 4, with filter media 5 thus having a generally rectangular perimeter 6 (which does not preclude irregularities, notches, chamfered or angled corners, or the like, in perimeter 6 of filter media 5). Frame 12 may thus take the form of a rectangular frame with four major elongate frame portions (12a, b, c and d) that are each mounted on one of the four major edges of the filter media and with pairs of neighboring frame portions meeting to form four corners 11 of frame 12 as shown in FIG. 1. For convenience in describing such generally rectangular geometry, the four major portions of frame 12 and components thereof may occasionally be referred to herein by a lettered subscript (e.g., a, b, c, or d). Not all corresponding features of the various frame portions are individually identified by number in the Figures, but will be understood to be present in many embodiments. It will be appreciated that in a rectangular filter, opposing frame portions (e.g., portions 12a and 12c; and, portions 12b and 12d, as shown in FIG.

1) may be identical to each other in some cases. In the case of a square filter, all four portions may be identical to each other in some cases.

As most easily seen in FIG. 2, at least one frame portion of frame 12 comprises a downstream flange 60 and an upstream flange 30, which flanges are positioned relatively close to each other (e.g. within 3, 2 or 1 mm) and generally parallel to each other so as to compressively hold border portion 7 of filter media 5 therebetween. Frames of this general type are sometimes referred to as pinch frames or compression frames, and are distinguished from e.g. channel frames that exhibit a generally U-shaped profile in which upstream and downstream flanges are relatively far from each other and in which the filter media is not necessarily held with any significant degree of compression. In some embodiments, an inwardmost edge 68 of downstream flange 60 may be aligned (along an inward-outward direction, as shown in FIG. 2) within e.g. about 4 mm, 2 mm, 1 mm, or 0.5 mm, on average, of an inwardmost edge 38 of upstream flange 30.

The at least one portion of frame 12 further comprises an outer sidewall 40, which extends downstream (and in some embodiments, outward) from upstream flange 30 and is foldably connected thereto at outer junction 35 as shown in FIG. 2. Upstream flange 30 and outer sidewall 40 define an outer angle Ω with a vertex coinciding with outer junction 35. Outer angle Ω will, in many embodiments, be greater than 80 degrees. In various embodiments, outer angle Ω may be at least 80, 90, 100, 110, or 120 degrees. In further embodiments, outer angle Ω may be at most 145, 135, 125, 115, 105, or 95 degrees. In some specific embodiments, outer angle Ω may be within plus or minus 5 degrees of 90 degrees (i.e., 85-95 degrees, as in the exemplary design of FIG. 2). For example, a nominal angle of e.g. 90 degrees may be targeted in production.

The at least one portion of frame 12 further comprises an inner sidewall 50, which extends outward and downstream from downstream flange 60 and is foldably connected thereto at inner junction 55. Downstream flange 60 and inner sidewall 50 define an inner angle t with a vertex coinciding with inner junction 55. Inner angle t will, in many embodiments, be greater than 100 degrees. In various embodiments, inner angle t may be at least 100, 110, 120, or 130 degrees. In further embodiments, inner angle t may be at most 165, 155, 145, 135, or 125 degrees. In some specific embodiments, inner angle t may be in the range of 125-140 degrees. For example, a nominal angle of e.g. 130-135 degrees may be targeted in production.

The at least one portion of frame 12 is configured so that outer sidewall 40 and inner sidewall 50 meet each other, and are foldably connected to each other, at sidewall junction 45 as indicated in FIG. 2. Outer sidewall 40 and inner sidewall 50 define a sidewall included angle σ with a vertex located at sidewall junction 45. Sidewall included angle σ will, in many embodiments, will be less than 65 degrees. In further embodiments, sidewall included angle σ may be at most 55, 45, 35, 25, 15, or 5 degrees. In various embodiments, sidewall included angle σ may be at least 0, 10, 20, 30, 40, 50 or 60 degrees. In some specific embodiments, sidewall included angle σ may be in the range of 40-55 degrees. For example, a nominal angle of e.g. 45 degrees may be targeted in production.

In many convenient embodiments, all four filter frame portions (e.g., 12a-12d) may comprise the above-recited upstream and downstream flanges and inner and outer sidewalls and junctions/foldable connections therebetween. In this context, the term foldable signifies that a frame portion is formed (i.e. into a folded configuration of the general type shown in FIG. 2) by starting with a frame piece that is flat as made (e.g. of the general type depicted in FIG. 7), and folding the various flanges and sidewalls of the frame piece relative to each other along various score/fold lines as described later herein in detail. The term foldable does not denote that the frame portion (or the entirety of frame 12), once formed, is foldable in the sense that it can be collapsed or folded flat. In fact, as will be made clear herein, in various embodiments frame 12, once formed, will not be collapsible or foldable.

Figure 7:
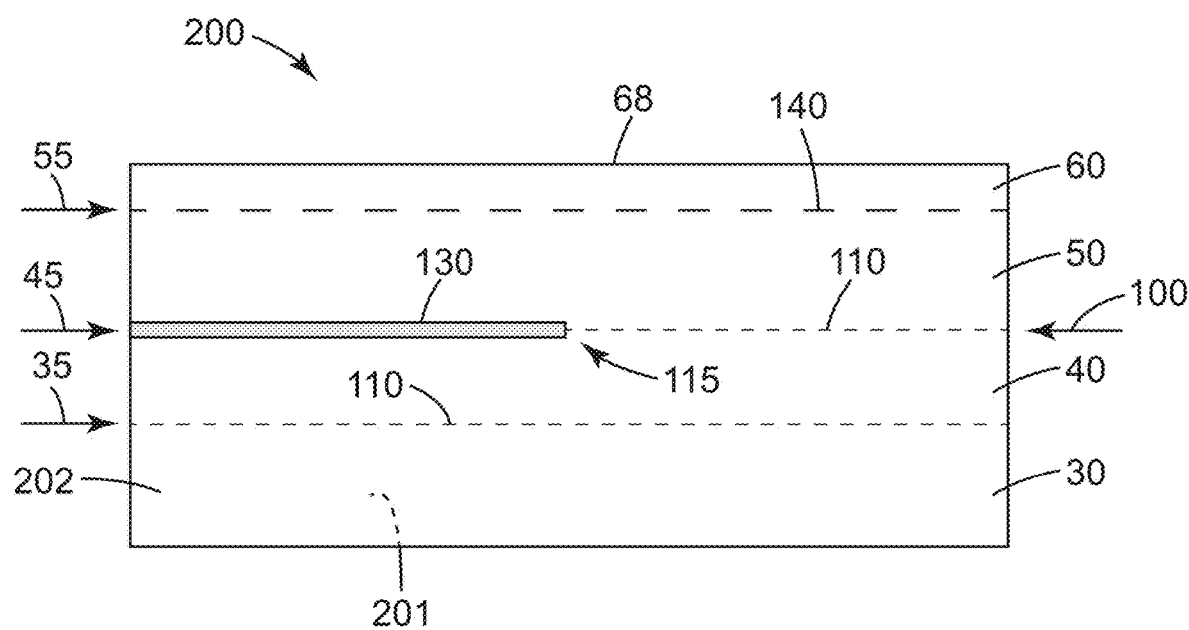
FIG. 7 is a plan view of a portion of an exemplary frame piece that may be folded and assembled with other frame pieces to form a filter frame, as disclosed herein.

A frame piece can thus be transformed from a flat configuration of the general type shown in FIG. 7, to a folded configuration of the general type shown in FIG. 2, by folding the various flanges and sidewalls along appropriate fold lines that provide the foldable connections/junctions between the flanges and sidewalls. To facilitate these folding operations, the frame piece can be provided with score lines 100 that cause the frame piece to preferentially fold along the score lines. That is, a fold line is an elongate line that follows (i.e., is dictated by, and thus coincides with) a score line. In many embodiments, such a score/fold line may be at least substantially or essentially straight line. Thus, the above-described inner junction, outer junction, and sidewall junction, can respectively extend along an inner fold line, an outer fold line, and a sidewall fold line, that are respectively defined by an inner score line, an outer score line, and a sidewall score line.

Several types of scoring can be used to provide a score line (or, as disclosed herein, a segment of a score line). A first type of score line 100 is a cut-scored line 110, which is shown in idealized generic representation in FIG. 3. In cut-scoring, the material (e.g. paperboard, chipboard or the like) of a frame piece 200 is cut with a sharp blade that penetrates partially, but not completely, through the thickness of the frame piece. That is, the cutting blade penetrates into a first, contact surface 111 of the frame piece but stops short of penetrating through to the opposing, second surface 112. In various embodiments, a cut-scored line may comprise a depth of penetration of from 10, 20, 30, 40, or 50, to 90, 80, 70, or 60, percent of the thickness of the frame piece. In specific embodiments, a cut-scored line may comprise a depth of penetration of from 55 to 75 percent, or from 60 to 70 percent, of the thickness of the frame piece. The remaining uncut material 113 can act as a hinge allowing the two panels that are connected by the hinge to be foldably moved relative to each other.

Figure 3:
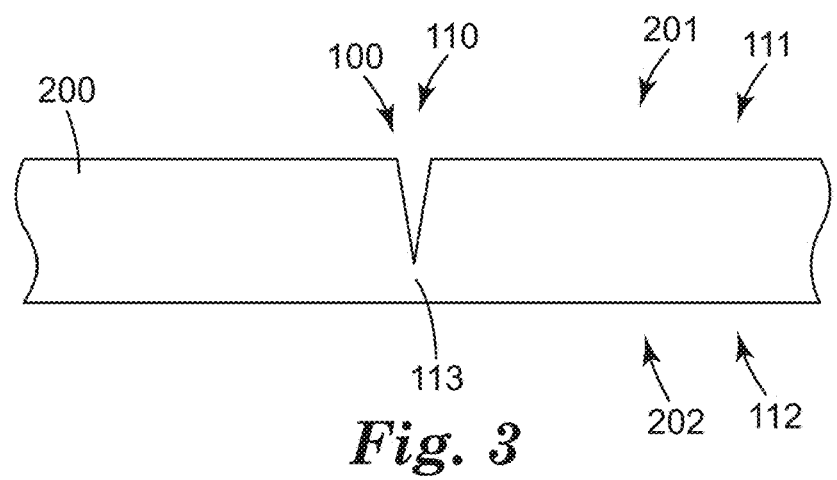
FIG. 3 is a cross-sectional view of an exemplary cut-scored line in generic representation.

A cut-scored line 110 (when viewed in cross-section along the long axis of the score line as in FIG. 3), prior to folding, takes the form of a relatively narrow and high-aspect ratio cut or fissure with relatively little deformation of the material of the frame piece at locations laterally adjacent to the cut and/or on the opposing, second surface 112 of the material, as is evident from inspection of FIG. 3. Panels are customarily folded along cut-scored lines in a direction that causes the cut to open wider. That is, in the view of FIG. 3, the two panels that are connected at score line 100 would each be moved downward to perform the folding. This is to avoid the faces of the cut-score binding against each other and resisting the folding, as will be readily apparent to ordinary artisans.

Figure 4:
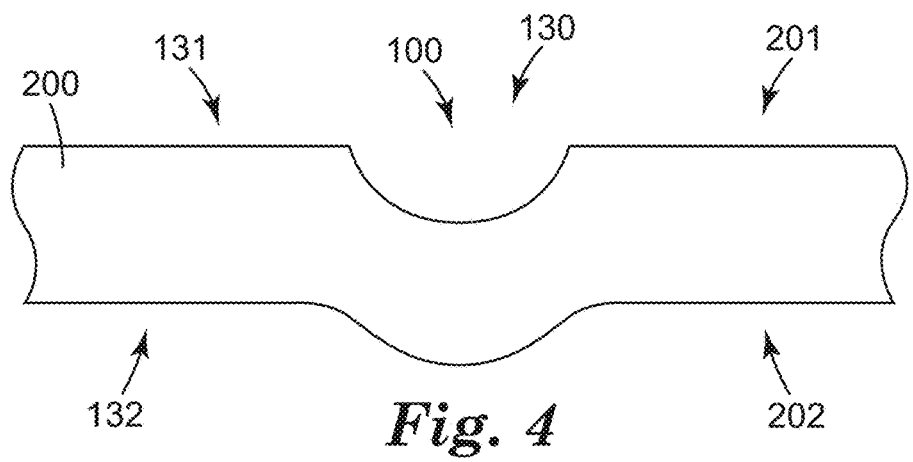
FIG. 4 is a cross-sectional view of an exemplary crush-scored line in generic representation.

A second type of score line 100, which is shown in idealized generic representation in FIG. 4, is a crush-scored line 130. In crush-scoring, the material of a frame piece 200 is contacted with a member that is relatively rounded/blunt and/or wide in comparison to a blade used for cut-scoring. The crushing member is impinged into a chosen area of first, contact surface 131 in such manner as to crush into the frame piece material in that area. Often, areas of the opposing, second surface 132 that are adjacent to the contact area will be supported (e.g. by surfaces of a metal fixture), while the area of opposing, second surface 132 of the frame piece that is directly opposite (underneath) the contact area will be unsupported, to allow local deformation of the frame piece material. Such a crush-scored line 130 (when viewed in cross-section along the long axis of the score line as in FIG. 4) thus typically takes the form of a relatively wide and shallow inwardly-deformed recess on the contact side of the frame piece, with a corresponding outwardly-deformed, rounded protrusion on the opposite side of the frame piece, as evident from inspection of FIG. 4. (In contrast, a cut-score may be only faintly visible, or not visible at all, when viewed from the opposite side of the frame piece.) Artisans skilled in the art of scoring will readily distinguish cut-scored lines from crush-scored lines, both prior to, and after, the material is folded. Panels are customarily folded along crush-scored lines in a direction that causes the first-side recess to open wider, for reasons that are readily evident to ordinary artisans. That is, in the view of FIG. 4, the two panels that are connected at score line 100 will each be moved downward to perform the folding.

A third type of scoring is perforation. As defined herein, perforating is a process in which successive, spaced apart areas (that are e.g. aligned along a linear path) of frame piece material are cut with a blade that passes through the entire thickness of the frame piece to leave a through-hole. A perf-scored line thus comprises a succession of through-holes that are spaced apart along a frame piece. Artisans skilled in the art of scoring will readily distinguish perf-scored lines from cut-scored lines and crush-scored lines.

By whatever method a score line 100 is achieved, it will be understood that such a score line will define a fold line along which two panels of a frame piece (e.g. flanges and/or sidewalls) will preferentially fold upon the application of appropriate bending force to the panels. The score line will thus be present at (and in fact will have defined) the junction between the two panels, in the frame portion that results from the folding process. For convenience, such a relationship will be described in terms of the junction, and the corresponding fold line, as "following" the score line. (Strictly speaking, panels of a frame piece will not become flanges or sidewalls until the panels are actually folded to form a frame portion. However, such panels of a frame piece may occasionally be referred herein to as flanges or sidewalls for convenience of description.)

It will be appreciated that outer angle $\Omega$ and inner angle $t$ result from folding frame piece panels (e.g. from an initially flat configuration) through a folding angle that is relatively small. Any desired scoring method may be used to provide the score lines along which the various panels are folded. In some convenient embodiments, outer junction 35 (between outer sidewall 40 and upstream flange 30) may follow a score line that is cut-scored, while inner junction 55 (between downstream flange 60 and inner sidewall 50) may follow a score line 140 that is perforated as discussed elsewhere herein with regard to FIG. 7.

The present work has revealed that a junction that follows a cut-scored line 110 may be subject to at least some degree of deformation if such a junction is the result of folding the panels that are foldably connected to each other at the cut-scored line 110, through a folding angle that is relatively large, e.g. more than 90 degrees. Specifically, it has been found that in some such cases the surfaces of the panels that bracket the score/fold line, may deform (e.g. bulge) away from each other at least slightly. Due to the relatively large folding angle that the outer and inner sidewalls 40 and 50 undergo relative to each other to establish a sidewall included angle $\sigma$ of e.g. less than 65 degrees, the junction 45 between these sidewalls has been found to be particularly susceptible to this phenomenon. (By way of a specific example, a sidewall included angle $\sigma$ of 45 degrees implies that in forming the frame portion, the panels that form the inner and outer sidewalls 50 and 40 were folded through a folding angle of approximately 135 degrees from their original, flat (180 degree) configuration.) This is in contrast to inner and outer junctions 55 and 35, which typically undergo a smaller folding angle than that experienced by sidewall junction 45 and have not been found to be particularly susceptible to this. (By way of a specific example, an outer angle $\Omega$ of 90 degrees implies that in forming the frame portion, the panels that form the outer sidewall 40 and the upstream flange 30 were folded through a folding angle of approximately 90 degrees from their original, flat configuration.)

When the above-described deformation occurs at a sidewall junction 45, the remaining uncut material 113 underlying the cut-score 110 typically remains intact so that the inner and outer sidewalls 50 and 40 do not completely separate from each other along the sidewall junction 45. However, the separation of the visible surfaces of the sidewalls from each other may be so great as to be aesthetically displeasing. Such an occurrence may be particularly apparent when visible major surfaces of the frame piece comprise an aesthetic surface 201 of the type often found on the frames of air filters. That is, in many cases the first, contact surface 111 of a frame piece (i.e., the surface through which the frame piece is cut) may be coated with an aesthetic coating to provide an aesthetic surface 201. Often, such a surface coating may comprise a pigment (e.g. a white pigment such as clay, titanium dioxide, barium sulfate, or the like) and/or may be printed with various indicia or the like. Such arrangements can provide that when the frame piece is folded to form a frame, the majority (e.g. essentially all) of the visible surfaces of the finished frame exhibit the aesthetic surface 201. In contrast, the second, opposing surface 112 of the frame piece may not be visible to any significant extent and thus is often left uncoated for purposes of economy so that it comprises an as-made, (e.g. non-aesthetic) surface 202. (In embodiments in which the frame piece is made of paperboard, such a surface 202 may often exhibit the characteristic light-brown color of kraft paper.) The above-noted deformation/separation may be accentuated by the presence of an aesthetic surface on the visible surfaces of the inner and outer sidewalls (however, it is emphasized that the problem can still occur, and be visible, even in the absence of such an aesthetic surface).

It will thus be appreciated that deformation/separation of inner and outer sidewall surfaces may occur along a sidewall junction 45 that follows a cut-scored line; and, that the presence of an aesthetic surface on the visible surfaces of the inner and outer sidewalls can exacerbate the aesthetically displeasing nature of any separation. In theory such difficulties might be addressed by using a sidewall junction that follows a crush-scored line rather than a cut-scored line. However, in the present work it has been found that a crush-scored line, while overcoming the above-recited difficulties, causes other difficulties. Specifically, a crush-scored line typically results in a stiffer (harder to fold) foldable connection than a cut-scored line. This can render it more difficult to perform the required folding operations; and, it can result in aesthetically displeasing creases being formed in the otherwise-flat sidewall panels. That is, some small but visible degree of bending may occur at locations other than the desired folding location along the fold line defined by the crush-scored line.

In the present work it has been found that using a combination of cut-scoring and crush-scoring (which may be referred to for convenience herein as "skip-scoring") can alleviate such difficulties. Specifically, a sidewall score line 100 that defines a junction 45 between inner and outer sidewalls 50 and 40 can be cut-scored along most of its length, but can include one or more relatively short crush-scored segments. Such an arrangement can alleviate the above-described issues while preserving advantages (e.g. ease of folding and rapid process speed) of cut-scoring along much of the sidewall score line along with utilizing the strength and aesthetic appeal obtained by including one or more relatively short crush-scored segments. Thus in some such embodiments, a relatively short crush-scored segment can act as a "ripstop" to prevent propagation of the above-described deformation/separation along a cut-scored segment. At the same time, the crush-score segment will not be so long as to give rise to the above-described creasing. Moreover, a skip-scored arrangement avoids the nonuniformity (broken appearance) that is characteristic of perf-scored fold lines.

Thus as disclosed herein, a sidewall score line 100 that defines a sidewall junction 45 may comprise at least one cut-scored segment 110 and at least one crush-scored segment 130, which segments are arranged in series along the sidewall score line 100 and collectively provide the sidewall score line 100. By arranged in series is meant that the cut-scored segment 110 and the crush-scored segment 130 are arranged in at least generally end-to-end, aligned fashion along the score line. (Such an arrangement is distinguished from e.g. crush-scores and cut-scores that run parallel to each other along a score line in side-by-side (e.g. railroad-track) fashion). Adjacent ends of a cut-scored segment 110 and a crush-scored segment 130 will meet at a junction 115 as indicated in exemplary embodiment in FIGS. 6 and 7. In various embodiments, such adjacent ends will be located within less than e.g. 4, 3, 2, 1.0, or 0.5 mm of each other. That is, in many embodiments a junction 115 may include little or no unscored frame piece material between adjacent ends of a crush-scored segment 130 and a cut-scored segment 110 of a score line 100.

In various embodiments a sidewall score line 100 may be cut-scored along at least 60, 70, 80, 90 or 95% of the total elongate length of the sidewall score line. Of the remaining elongate length of the score line (e.g. 10% of the total length if the cut-scored segment occupies 90% of the total length), in various embodiments at least about 80, 90, 95, or 98% of the remaining elongate length of the sidewall score line may be crush-scored. In further embodiments, a sidewall score line may be cut-scored along at most 98, 95, 90, 85, 75 or 65% of the total elongate length of the sidewall score line, with at least about 80, 90, 95, or 98% of the remaining elongate length of the sidewall score line being crush-scored.

By a crush-scored segment of a score line is meant a crush-score that is at least 2 cm in elongate length, but that is no more than 20 cm in elongate length. In various embodiments, a crush-scored segment may be at least 2.5, 3.5, or 4.5 cm in length. In further embodiments, a crush-scored segment may be at most 15, 12, 10, 8, 6, 5.0, 4.0, or 3.0 cm in length. By a cut-scored segment is meant a cut-score that is at least 2 cm in elongate length; a cut-scored segment has no upper limit on its elongate length. In various embodiments, a cut-scored segment may be at least 4, 6, 10, 20, 30, 40, or 50 cm in elongate length. By definition, a cut-scored segment is at least generally continuous, meaning that it is not interrupted by unscored sections over more than 15% of the elongate length of the cut-scored segment. In various embodiments, less than 10, 5 or 2% of the elongate length of the cut-scored segment will be interrupted by unscored sections. In many embodiments, a cut-scored segment will be essentially continuous (i.e. uninterrupted by any unscored sections).

Having relatively long cut-scored segments and/or having cut-scored segments that are generally continuous can, for example, advantageously avoid the non-uniform appearance of a perforated score/fold line. Thus in reference to the exemplary design of FIG. 1, in some embodiments the entirety of the length of the sidewall score line 100*a* of frame portion 12*a* may take the form of cut-scored segments 110*a*, except where such segments are interrupted by corner crush-scored segment 130$a_c$ and intermediate crush-scored segment 130$a_i$ (and by a similar corner crush-scored segment, if present, proximate the 12*a*/12*d* corner of the frame).

Corner crush-scored segment and intermediate crush-scored segments are described in detail below. Here and elsewhere, indicia such as "a" (e.g. of 130*a*, 12*a*, and so on) refer to a representative frame portion (e.g. portion 12*a*), while subscripted indicia "c" and "i" refer respectively to corner crush-scored segments and intermediate crush-scored segments of sidewall junction score/fold lines.

Figure 6:
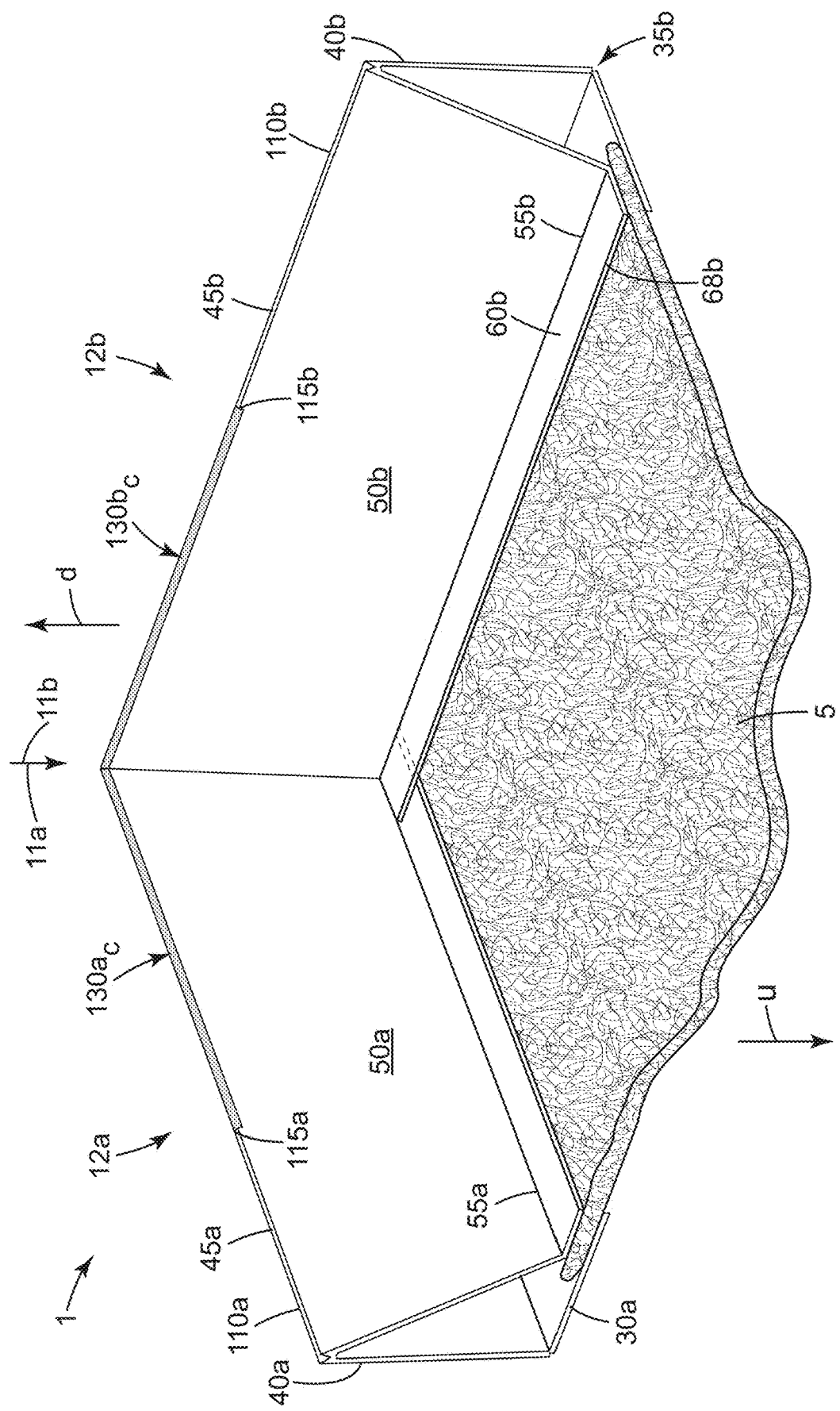
FIG. 6 is a perspective view of a corner of an exemplary framed air filter.

It has been found that the above-described sidewall deformation/separation may be more likely to occur at locations that are subjected to relatively high stress, e.g. at or near the corners 11 of frame 12. Thus, in some embodiments a frame portion will comprise a sidewall score line that includes a corner crush-scored segment 130 at one or both end sections of the frame portion. For example, frame portion 12*a* of FIG. 1 includes a corner crush-scored segment 130$a_c$. In some embodiments, neighboring frame portions may comprise crush-scored segments 130 at the ends of the sidewall score lines of both frame portions, such that a corner of the frame is bracketed by crush-scored segments. In some embodiments, all four corners may be bracketed by crush-scored segments. Thus in the exemplary depiction of FIG. 1, the corner 11*a-b* of frame 12 formed by neighboring frame portions 12*a* and 12*b* is bracketed by corner crush-scored segment 130$a_c$ that is provided at an end section of frame portion 12*a* in combination with corner crush-scored segment 130$b_c$ that is provided at an end section of frame portion 12*b*. (A magnified view of such a corner of an exemplary frame, indicating the various corner crush-scored segments 130, their neighboring cut-scored segments 110, and junctions 115 therebetween, is shown in FIG. 6.) Although not all such corner crush-scored segments are shown in FIG. 1, in many embodiments the other three corners of the frame may be similarly bracketed by corner crush-scored segments if desired.

In some specific embodiments, a corner 11 of frame 12 may comprise short unscored segments immediately adjacent (and bracketing) the corner. By unscored is meant that the segment is neither cut-scored nor crush-scored. By a short segment is meant a segment that is 10 mm or less in elongate length. In various embodiments, a short unscored corner segment may be less than 5, 4, 3 or 2 mm in length. Thus in some embodiments some or all corners 11 of frame 12 may be bracketed by short unscored segments, with each pair of short unscored segments being bracketed in turn by the above-described corner crush-scored segments 130. It will thus be apparent that the end of a corner crush-scored segment 130 that is proximal to a corner 11, will not necessarily have to be located in direct proximity to (e.g. within 2 mm of) the corner. However, in various embodiments such an end of a corner crush-scored segment will be less than 5, 4, 3, or 2 mm away from the corner. In some embodiments, the ends of the corner crush-scored segments may be located sufficiently close (e.g. within 1 mm or less) to the corner that no short unscored corner segments are present.

It has been found that the above-described sidewall deformation/separation may be more likely to occur if a relatively long, uninterrupted cut-scored line 110 is present. Thus in some embodiments, one or more intermediate crush-scored segments 130 may be provided at an intermediate location of a sidewall score line, i.e. at a location or locations distal to the ends of the frame portion. In some embodiments involving a rectangular frame, only the pair of longest opposing frame portions (e.g. portions a and c of FIG. 1) may comprise an intermediate crush-scored segment 130 (e.g. in addition to corner crush-scored segments 110), as indicated in FIG. 1. In such embodiments the remaining pair of shortest opposing frame portions (e.g. portions b and d of FIG. 1) may lack any intermediate crush-scored segments and may thus comprise a continuous cut-scored segment that is free of any crush-scored segments except for one or more corner crush-scored segments. In some embodiments in which all four sides of a framed air filter are relatively short (e.g. 20 inches or less), no intermediate crush-scored segment may be present on any frame portion; rather, some or all of the frame portions may comprise one or more corner crush-scored segments.

In other embodiments (e.g. in which all four sides of the air filter are greater than 20 inches long), all four of the frame portions of a frame 12 may comprise one or more intermediate crush-scored segments 130. Furthermore, while the exemplary design of FIG. 1 depicts frame portions 12a and 12c with only a single intermediate crush-scored segment, located substantially at a midpoint of the elongate length of the frame portion, any number of intermediate crush-scored segments may be present, at any location distal from an end of the frame portion. Thus for example, two or more intermediate crush-scored segments may be e.g. spaced along the elongate length of a frame portion.

Figure 5:
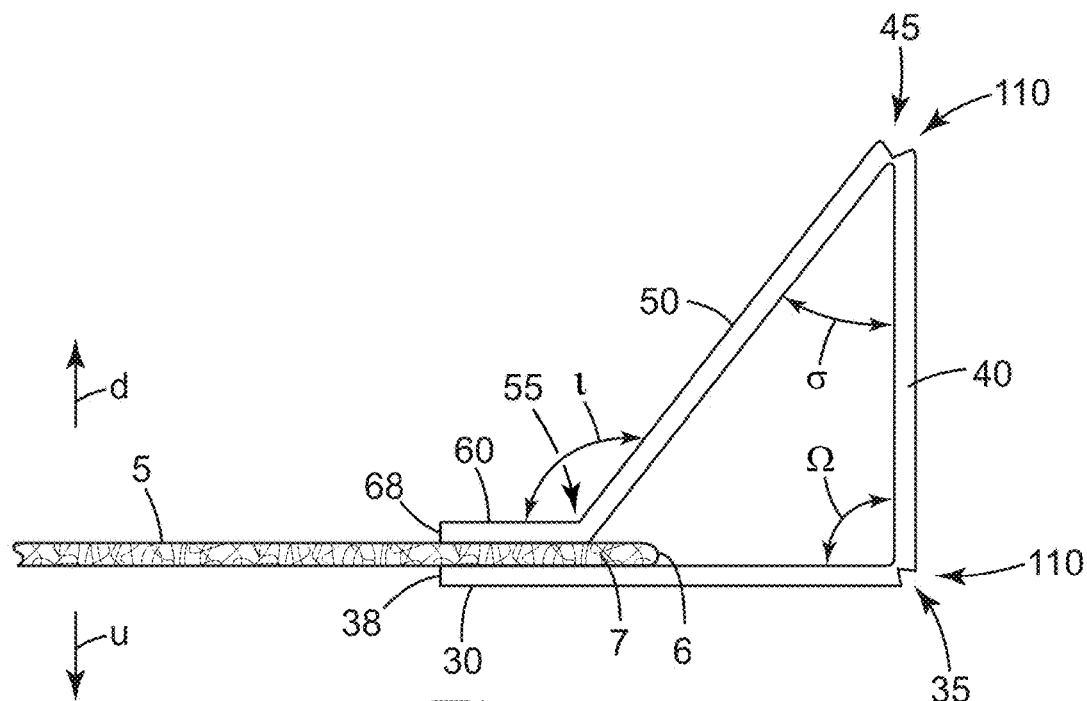
FIG. 5 is a cross-sectional slice view of a portion of the exemplary framed air filter of FIG. 1, taken along line 5-5.

Based on the above discussions, it can now be appreciated that FIG. 2 is a cross-sectional view taken at a location at which a portion of sidewall score line 100c is provided by an (intermediate) crush-scored segment 130$c_i$. In contrast, FIG. 5 is a cross-sectional view taken at a location at which a portion of sidewall score line 100c is provided by a cut-scored segment 110c, as indicated in exemplary, generic representation in FIG. 5. (It is emphasized that in all such Figures, the depictions of crush-scored segments and cut-scored segments are exemplary, generic representations.)

As noted earlier herein, in various embodiments inner sidewall 50 and outer sidewall 40 may be positioned at various sidewall included angles σ relative to each other (when viewed in cross section as shown in FIG. 2, and as measured from the vertex provided by sidewall fold line/junction 45). Ordinary artisans will appreciate that the sidewall included angle of the frame portions, e.g. in combination with other parameters such as the outer sidewall angle Ω of the frame portions, can be chosen so that in some embodiments the frame is not nestable. In other embodiments such parameters can be chosen so that the framed air filter is nestable.

By nestable is meant that multiple filters 1 (of at least substantially the same shape and size), can be stacked so that they collectively occupy less than 70% of the total height obtained by multiplying the height of each filter by the number of filters. For purposes of such calculation, the height of a filter is the distance, along an axis normal to the major plane of the filter, from the farthest downstream point of the filter (which in the depiction of FIG. 2, will be provided by the point designated 45), to the farthest upstream point of the filter (which in the depiction of FIG. 2 will be the upstream face of upstream flange 30). From this discussion it will be appreciated that, for example, framed air filters of the type depicted in FIG. 1 are not nestable. In some embodiments, a non-nestable framed filter will comprise four frame portions in which the outer sidewall angle is approximately 90 degrees (e.g. as in the exemplary design of FIG. 2).

In other embodiments, all of the frame portions may be configured (e.g., by the choice of sidewall included angle σ and outer angle Ω) so that the framed air filter is nestable. Frames that can be configured to produce nestable framed filters are depicted and described in detail in U.S. Pat. Nos. 8,702,829, 9,278,301 and 9,962,640, all of which are incorporated by reference in their entirety herein for this purpose.

In some embodiments, portions of frame 12 (e.g., four frame portions 12a, 12b, 12c, and 12d) may be derived from four individual, separately made frame pieces that are assembled with/connected to each other, and folded, to form frame 12. In other embodiments, one frame piece may provide two neighboring frame portions (e.g. 12a and 12b) and another frame piece may provide the two remaining neighboring frame portions (e.g. 12c and 12d). Such a frame piece may conveniently take the form of (e.g. after partial folding) an L-shaped frame piece in which the two arms of the L are integrally joined to each other by a foldable connection e.g. between the outer sidewalls of the arms of the L. In some embodiments such a foldable connection may be provided by a crush-scored line.

Such arrangements will be readily understood by ordinary artisans and are disclosed, for example, in U.S. Pat. No. 9,962,640, which is incorporated by reference in its entirety herein for this purpose. Two such L-shaped pieces may be mounted to the edges of a filter media and the terminal ends of each L-shaped piece may be bonded to the terminal ends of the other L-shaped piece. Such a frame may thus comprise two diagonally-opposing frame corners that are integral corners and two remaining diagonally-opposing frame corners that are bonded corners. (The term bonded is used broadly and encompasses any method of joining, whether by the use of adhesives, by mechanical fastening methods such as stapling, or any combination thereof.)

It is thus emphasized that a frame "portion" (e.g. portions 12a-d) denotes a portion of the frame that is mounted on a particular edge of the filter media. The term portion does not require that the portion is necessarily derived from a single frame piece that is mounted to that edge of the filter media to provide only that single frame portion. Nor does it necessarily require that the portion is derived from a section of an L-shaped frame piece that provides two frame portions, or from a section of a frame piece that provides all four frame portions. Any such arrangements are encompassed within this terminology.

Regardless of whether e.g. one, two, or four individual frame pieces are used, a frame portion 12 will be formed via the folding of foldably-connected, elongate panels of at least a part (or the entirety) of a frame piece. A part of an exemplary frame piece 200 from which can be formed a frame portion of the general type shown in FIG. 2, is depicted in exemplary, generic representation in FIG. 7. The frame piece of FIG. 7 comprises panels 30 and 60 that will respectively form the upstream flange and the downstream flange of a frame portion. Terminal edges 38 and 68 of the frame piece will form corresponding edges 38 and 60 of the thus-formed flanges. The frame piece further comprises panels 40 and 50 that will respectively form the outer and inner sidewalls of the frame portion. Panels 30 and 40 are joined by a foldable connection that comprises a cut-scored line 110 that, when the panels are folded along the score line, will provide outer junction 35. Panels 50 and 60 are joined by a foldable connection that comprises a perforated score line 140 that, when the panels are folded along the score line, will provide inner junction 55.

Panels 40 and 50 that will form the outer and inner sidewalls, are joined by a foldable connection that comprises a sidewall score line 100 that will form sidewall junction 45. Sidewall score line 100 includes a cut-scored segment 110 and a crush-scored segment 130, that are arranged in series along the elongate length of the score line and that meet at a junction 115.

Based on the discussions herein, it will be appreciated how panels 30-60 can be folded along the respective score lines to form a frame portion of the type disclosed herein. The view of FIG. 7 is from opposing side 112/132 of the frame piece rather than from "contact" side 111/131 on which the cut-scoring blade and the crush-scoring member are impinged. As discussed earlier with regard to FIG. 3, in some instances cut-scores may be only faintly visible, or not evident at all, from the side opposite from that on which the cut-scoring blade is impinged. Therefore, cut-scored segment 110 of sidewall junction 45, and cut-scored line 110 of outer junction 35, are shown in hidden lines. (As discussed earlier with regard to FIG. 4, crush-scores typically leave a visible protrusion on the side opposite from that on which the crush-scoring member is impinged, therefore crush-scored segment 130 of sidewall junction 45 is not shown in hidden lines.)

In many convenient embodiments a frame piece 200 may be cut-scored and crush-scored (and e.g. perf-scored) from the same side. In other words, in many embodiments the previously-discussed contact side 111 with regard to cut-scoring, and the contact side 131 with regard to crush-scoring, may be the same side. (As noted, in many embodiments side 111/131 may exhibit an aesthetic surface 201.) In some convenient embodiments, the cut-scoring and crush-scoring (and any perf-scoring, if performed) may be performed at the same time, using the same apparatus. In various embodiments, such an apparatus may be a rotary-scoring apparatus or a batch (e.g. platen) scoring apparatus. (If desired, the outer borders of the frame piece may be cut, e.g. die-cut, in the same operation.)

While it may be convenient in some embodiments that outer junction 35 follows a cut-scored line 110 and inner junction 55 follows a perf-scored line 140, these junctions are not necessarily limited to these particular scoring methods. In fact, in the present work it has been found that inner junction 55 may in some instances be defined by a cut-score line 110. In particular embodiments this cut-score line can be cut-scored from the same side as the other score lines, for ease of manufacturing. It will thus be appreciated that such an arrangement necessitates that panels 60 and 50 are folded in a direction that closes the cut-score rather than opening the cut-score in the manner described previously as being the customary practice. Because junction 55 is not subjected to a very large folding angle, it is possible to successfully perform this "backwards" folding without the faces of the cut-score binding on each other. Thus in some embodiments inner junction 55 may be defined by a cut-scored line, which offers aesthetic advantages over such a junction as defined by a perf-scored line.

As noted, in some embodiments (e.g. in which two neighboring frame portions are derived from a single L-shaped frame piece) a corner 11 of frame 12 may be an integral corner in which e.g. the ends of the outer sidewalls of the respective frame portions are integrally connected to each other. In some embodiments, a corner 11 of frame 12 may be a bonded corner in which ends of frame portions are not integral with each other as made but rather are bonded to each other after the frame is formed. In some embodiments, such a bonded corner may be a tabbed corner in which an outer sidewall of one of the frame pieces comprises a tab that extends foldably therefrom. Such a tab can be contacted with the inner and/or outer sidewall of the neighboring frame piece (and can be bonded thereto if desired) e.g. to improve the mechanical strength of the frame corner. In various embodiments, such a tab may be in contact with an inner surface of the inner sidewall (and e.g. bonded thereto), in contact with an outer surface of the outer sidewall (and e.g. bonded thereto), or it may be inserted into the gap between the inner and outer sidewalls (and bonded to one or both sidewalls). Tabbed corners are described e.g. in U.S. Pat. No. 8,702,829 (and are depicted e.g. in FIG. 3 thereof), which is incorporated by reference herein in its entirety for this purpose.

Various other arrangements of e.g. "locking" tabs, "offset" slots, and so on, may be present at one or more corners 11 of frame 12, and may, for example, enhance the stability of the frame while the frame is partially assembled, may reduce air leaks at the corners of the assembled frame, etc. Various arrangements of such features are disclosed e.g. in U.S. Pat. Nos. 8,702,829 and 9,962,640, which are incorporated by reference herein for this purpose.

The elongate length of a frame piece 200 (i.e. along the left-right direction of FIG. 7) may be chosen so that a framed filter of a desired nominal size (e.g., nominal 20"×20", 20"×25", etc.) may be assembled therefrom. The width of a frame piece 200 and of individual panels thereof (i.e., along the up-down direction of FIG. 7) may be chosen as desired. It may be convenient to choose the widths of the various panels in view of the folded configuration to be formed and in particular the various angles that are to be employed. In various embodiments, the width of downstream flange 60 may be about 30-40% of the width of upstream flange 30. In various embodiments, the width of inner sidewall 50 may be about 115-135% of the width of outer sidewall 40. In various embodiments, the width of outer sidewall 40 may be about 70-90% of the width of upstream flange 30.

It will be appreciated that in instances in which outer angle Ω is nominal 90 degrees, the width of panel (outer sidewall) 40 may establish the nominal thickness (referred to as filter "height" in the discussion of nestability earlier herein) of the framed filter. For example, outer sidewall 40 may comprise e.g. a ⅞" width in order to provide a nominal X"×X"×1" framed filter. A "nominal" 90 degree angle is mentioned in view of the fact that in actual production (e.g. if framed filters are shrink-wrapped), filter frames made with a nominal 90 degree outer angle Ω may occasionally exhibit a slightly smaller angle (e.g. down to 85 degrees), particularly at locations of a frame portion that are far from a frame corner, due to the compressive action of shrink-wrapping.

Frame piece 200 may be made of any suitable material, e.g. paperboard, plastic, metal and so on, into which may be imparted score/fold lines as described herein. In particular embodiments, frame piece 200 may be made of paperboard of thickness in the range of 20-30 thousandths of an inch. In specific embodiments, frame piece 200 may be made of single-layer paperboard rather than corrugated paperboard. However, any suitable material (e.g. multilayer paperboard or the like) may be used.

Any suitable air filter media 5 may be used in filter 1. As mentioned, air filter media 5 may conveniently comprise a generally rectangular perimeter 6 which may be shaped and sized to match the shape and size of frame 12. Air filter media 5 is typically sheet-like, with a length and width that are greater than the thickness of the air filter media and with an overall planar configuration (even if pleated). Although FIGS. 1-2 illustrate an air filter 1 comprising nonpleated filter media 5, any suitable filter media, including pleated media, may be used. In some embodiments, filter media 5 may comprise an electret-comprising nonwoven material. In some embodiments, filter media 5 may comprise fiberglass fibers.

In some embodiments, filter media 5 (whether pleated or in substantially flat state or otherwise), may include one or more layers comprising an open cell structure, a porous media, a nonwoven scrims, reinforcing filaments, nettings, wire meshes, or any such structure(s), which may be provided along with the filter media (e.g., bonded thereto) and which may be made of any suitable material. In particular embodiments, filter media 5 may comprise reinforcing filaments of the general type described in U.S. Provisional Patent Applications 62/714,178 and 62/714,186, both of which are incorporated by reference in their entirety herein. Whether inherently, or by way of a reinforcing layer, it will be advantageous that filter media 5 be sufficiently strong as to survive the air pressure applied in conventional forced-air heating and/or cooling systems. Further advantages may be gained if the media is able to enhance the frame strength e.g. by distributing the air-pressure load over the various portions of the frame.

In some embodiments filter media 5 may comprise a bondable border area 7 that may be e.g. sandwiched between portions of upstream flange 30 and downstream flange 60 of frame 12 and may be attached to one or both flanges (e.g. by adhesive and/or by mechanical fasteners such as staples, as discussed previously herein). Although not shown in FIG. 2, some media may be somewhat compressible, such that the capturing of the media between the flanges and the pressing of the filter frame, may cause the media to be compressed (e.g., as much as 10, 20, 30% or more) from its uncompressed thickness.

LIST OF EXEMPLARY EMBODIMENTS

Embodiment 1 is a framed air filter, comprising: an air filter media comprising an at least generally rectangular perimeter with four major elongate edges; and, a four-cornered frame comprising four elongate frame portions, each elongate frame portion being mounted on one of the four major elongate edges of the filter media and with pairs of neighboring frame portions meeting to form one corner of the four corners of the frame, wherein each of the four elongate frame portions comprises an elongate inner sidewall and an elongate outer sidewall that meet at a sidewall junction that extends along a sidewall fold line, and wherein the sidewall fold line follows a sidewall score line that comprises at least one cut-scored segment and at least one crush-scored segment that are arranged in series along the sidewall score line.

Embodiment 2 is the framed air filter of embodiment 1 wherein each of the four elongate frame portions comprises elongate inner and outer sidewalls that define a sidewall included angle of less than 65 degrees.

Embodiment 3 is the framed air filter of any of embodiments 1-2 wherein at least some of the four elongate frame portions comprise a crush-scored segment that is at least 2 cm in length and that is at most 8 cm in length.

Embodiment 4 is the framed air filter of any of embodiments 1-3 wherein at least one of the four corners of the frame is bracketed by a first crush-scored segment that occupies an end section of a first sidewall score line of a first elongate frame portion, and a second crush-scored segment that occupies an end section of a second sidewall score line of a second, neighboring elongate frame portion.

Embodiment 5 is the framed air filter of embodiment 4 wherein all of the four corners of the frame are each bracketed by crush-scored segments of sidewall score lines of neighboring frame portions.

Embodiment 6 is the framed air filter of embodiment 5 wherein the entirety of a remaining section of each sidewall score line of each frame portion consists of the cut-scored segment of the sidewall score line.

Embodiment 7 is the framed air filter of embodiment 5 wherein at least two of the four elongate frame portions each comprises at least one intermediate crush-scored segment that is located between, and distal to, first and second corner-bracketing crush-scored segments of that frame portion, and wherein the at least one intermediate crush-scored segment is separated from the first corner-bracketing crush-scored segment by at least one first cut-scored segment and is separated from the second corner-bracketing crush-scored segment by at least one second cut-scored segment.

Embodiment 8 is the framed air filter of embodiment 7 wherein each intermediate crush-scored segment is located proximate a midpoint of the sidewall score line.

Embodiment 9 is the framed air filter of any of embodiments 1-8 wherein each elongate frame portion further comprises an elongate upstream flange that meets the elongate outer sidewall at an outer junction and wherein the elongate upstream flange and the elongate outer sidewall define an outer angle that is 85 degrees or greater.

Embodiment 10 is the framed air filter of embodiment 9 wherein the outer junction extends along an outer fold line that follows an outer score line that is a cut-scored line.

Embodiment 11 is the framed air filter of any of embodiments 1-10 wherein each elongate frame portion further comprises an elongate downstream flange that meets the elongate inner sidewall at an inner junction and wherein the elongate downstream flange and the elongate inner sidewall define an inner angle that is 120 degrees or greater.

Embodiment 12 is the framed air filter of embodiment 11 wherein the inner junction extends along an inner fold line that follows an inner score line that is a perf-scored line.

Embodiment 13 is the framed air filter of embodiment 11 wherein the inner junction extends along an inner fold line that follows an inner score line that is a cut-scored line.

Embodiment 14 is the framed air filter of any of embodiments 1-11 wherein all four of the elongate frame portions exhibit an outer angle of 85-95 degrees, an inner angle of 120-140 degrees, and a sidewall included angle of 35-65 degrees, and wherein the framed air filter is not nestable.

Embodiment 15 is the framed air filter of any of embodiments 11-14 wherein for each elongate frame portion the elongate upstream flange, the elongate downstream flange, the elongate outer sidewall, and the elongate inner sidewall, are all integral with each other.

Embodiment 16 is the framed air filter of any of embodiments 1-15 wherein the frame comprises a first pair of neighboring frame portions that are provided by a first integral L-shaped frame piece and a second pair of neighboring frame portions that are provided by second integral L-shaped frame piece, which L-shaped pieces are connected to each other so that the frame comprises two diagonally-opposing integral corners and two diagonally-opposing bonded corners.

Embodiment 17 is the framed air filter of embodiment 16 wherein the two diagonally-opposing integral corners each comprise an integral junction at which an end of elongate outer sidewall of a first frame portion is integrally, foldably connected to an end of an elongate outer sidewall of a second, neighboring frame portion.

Embodiment 18 is the framed air filter of embodiment 16 wherein the two diagonally-opposing bonded corners each comprise a tabbed junction in which a first frame portion comprises a tab that extends from a minor end of an elongate outer sidewall of that frame portion and is foldably connected thereto, with at least a portion of the tab being bonded to a portion of an inner sidewall and/or an outer sidewall of a second, neighboring frame portion.

Embodiment 19 is the framed air filter of any of embodiments 1-18 wherein the at least one cut-scored segment comprises an average cutting depth of from 45% to 85%.

Embodiment 20 is the framed air filter of any of embodiments 1-20 wherein the at least one cut-scored segment is a continuously-cut-scored segment that is not interrupted by any unscored segments.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification and the disclosure in any document incorporated by reference herein, this specification will control.

What is claimed is:

1. A framed air filter, comprising:
an air filter media comprising an at least generally rectangular perimeter with four major elongate edges; and, a four-cornered frame comprising four elongate frame portions, each elongate frame portion being mounted on one of the four major elongate edges of the filter media and with pairs of neighboring frame portions meeting to form one corner of the four corners of the frame, wherein each of the four elongate frame portions comprises an elongate inner sidewall and an elongate outer sidewall that meet at a sidewall junction that extends along a sidewall fold line, and wherein the sidewall fold line follows a sidewall score line that comprises at least one cut-scored segment and at least one crush-scored segment that are arranged in series along the sidewall score line.

2. The framed air filter of claim 1 wherein each of the four elongate frame portions comprises elongate inner and outer sidewalls that define a sidewall included angle of less than 65 degrees.

3. The framed air filter of claim 1 wherein at least one of the four corners of the frame is bracketed by a first crush-scored segment that occupies an end section of a first sidewall score line of a first elongate frame portion, and a second crush-scored segment that occupies an end section of a second sidewall score line of a second, neighboring elongate frame portion.

4. The framed air filter of claim 3 wherein all of the four corners of the frame are each bracketed by crush-scored segments of sidewall score lines of neighboring frame portions.

5. The framed air filter of claim 4 wherein the entirety of a remaining section of each sidewall score line of each frame portion consists of the cut-scored segment of the sidewall score line.

6. The framed air filter of claim 4 wherein at least two of the four elongate frame portions each comprises at least one intermediate crush-scored segment that is located between, and distal to, first and second corner-bracketing crush-scored segments of that frame portion,
and wherein the at least one intermediate crush-scored segment is separated from the first corner-bracketing crush-scored segment by at least one first cut-scored segment and is separated from the second corner-bracketing crush-scored segment by at least one second cut-scored segment.

7. The framed air filter of claim 6 wherein each intermediate crush-scored segment is located proximate a midpoint of the sidewall score line.

8. The framed air filter of claim 1 wherein each elongate frame portion further comprises an elongate upstream flange that meets the elongate outer sidewall at an outer junction and wherein the elongate upstream flange and the elongate outer sidewall define an outer angle that is 85 degrees or greater.

9. The framed air filter of claim 8 wherein the outer junction extends along an outer fold line that follows an outer score line that is a cut-scored line.

10. The framed air filter of claim 8 wherein each elongate frame portion further comprises an elongate downstream flange that meets the elongate inner sidewall at an inner junction and wherein the elongate downstream flange and the elongate inner sidewall define an inner angle that is 120 degrees or greater.

11. The framed air filter of claim 10 wherein the inner junction extends along an inner fold line that follows an inner score line that is a perf-scored line.

12. The framed air filter of claim 10 wherein the inner junction extends along an inner fold line that follows an inner score line that is a cut-scored line.

13. The framed air filter of claim 10 wherein all four of the elongate frame portions exhibit an outer angle of 85-95 degrees, an inner angle of 120-140 degrees, and a sidewall included angle of 35-65 degrees, and wherein the framed air filter is not nestable.

14. The framed air filter of claim 10 wherein for each elongate frame portion the elongate upstream flange, the elongate downstream flange, the elongate outer sidewall, and the elongate inner sidewall, are all integral with each other.

15. The framed air filter of claim 1 wherein the frame comprises a first pair of neighboring frame portions that are provided by a first integral L-shaped frame piece and a second pair of neighboring frame portions that are provided by second integral L-shaped frame piece, which L-shaped pieces are connected to each other so that the frame comprises two diagonally-opposing integral corners and two diagonally-opposing bonded corners.

16. The framed air filter of claim 15 wherein the two diagonally-opposing integral corners each comprise an integral junction at which an end of elongate outer sidewall of a first frame portion is integrally, foldably connected to an end of an elongate outer sidewall of a second, neighboring frame portion.

17. The framed air filter of claim 15 wherein the two diagonally-opposing bonded corners each comprise a tabbed junction in which a first frame portion comprises a tab that extends from a minor end of an elongate outer sidewall of that frame portion and is foldably connected thereto, with at least a portion of the tab being bonded to a portion of an inner sidewall and/or an outer sidewall of a second, neighboring frame portion.

18. The framed air filter of claim 1 wherein the at least one cut-scored segment comprises an average cutting depth of from 45% to 85%.

19. The framed air filter of claim 1 wherein the at least one cut-scored segment is a continuously-cut-scored segment that is not interrupted by any unscored segments.

20. The framed air filter of claim 1 wherein the four-cornered frame and the four elongate frame portions thereof, are all made of single-layer paperboard.

* * * * *